(12) United States Patent
Matsuura et al.

(10) Patent No.: US 10,511,219 B2
(45) Date of Patent: Dec. 17, 2019

(54) SWITCHING POWER SUPPLY WITH A MEASURING AND CALCULATING PROCESS FOR THE SWITCHING TIMES

(71) Applicant: TDK CORPORATION, Tokyo (JP)

(72) Inventors: Ken Matsuura, Tokyo (JP); Min Lin, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/380,077

(22) Filed: Apr. 10, 2019

(65) Prior Publication Data

US 2019/0319528 A1 Oct. 17, 2019

(30) Foreign Application Priority Data

Apr. 11, 2018 (JP) .................. 2018-075820

(51) Int. Cl.
| | | |
|---|---|---|
| *H02M 1/08* | (2006.01) | |
| *H02M 7/217* | (2006.01) | |
| *H02M 1/088* | (2006.01) | |
| H02M 1/42 | (2007.01) | |
| H02M 1/00 | (2006.01) | |
| H02M 1/44 | (2007.01) | |

(52) U.S. Cl.
CPC .......... *H02M 1/083* (2013.01); *H02M 1/088* (2013.01); *H02M 7/217* (2013.01); *H02M 1/4208* (2013.01); *H02M 1/44* (2013.01); *H02M 2001/0058* (2013.01)

(58) Field of Classification Search
CPC .... H02M 1/083; H02M 1/088; H02M 1/4208; H02M 1/44; H02M 2001/0058; H02M 7/12; H02M 7/155; H02M 7/162; H02M 7/21; H02M 7/217; H02M 7/219

See application file for complete search history.

(56) References Cited

U.S. PATENT DOCUMENTS

| | | | |
|---|---|---|---|
| 9,431,868 B2 | 8/2016 | Ye | |
| 9,431,896 B2 | 8/2016 | Ye | |
| 10,333,417 B2 * | 6/2019 | Song ................. | H02M 3/33592 |

(Continued)

FOREIGN PATENT DOCUMENTS

| | | |
|---|---|---|
| JP | 2014-011907 | 1/2014 |
| JP | 2017-505097 | 2/2017 |

*Primary Examiner* — Yusef A Ahmed
*Assistant Examiner* — Shahzeb K Ahmad
(74) *Attorney, Agent, or Firm* — Greenblum & Bernstein, P.L.C.

(57) ABSTRACT

A switching power supply includes a power converter with an inductor and first and second switches that converts a voltage Vac to a voltage Vdc, a detector with a winding that detects zero timing of an inductor current, and a driving signal generator that switches on the second switch based on the zero timing and then switches on the first switch. The driving signal generator ends a period T2 before the zero timing by executing a measuring process for an on period T1 of the second switch, a process that calculates the period T2 from $T2=T1\times|Vac|/(Vdc-|Vac|)-Tc$ using a correction time Tc, a process that switches on the first switch for only the period T2, a process that measures an elapsed time between the periods T2 and T1, and a process that changes the correction time Tc so that the elapsed time becomes a target time.

2 Claims, 4 Drawing Sheets

(56) References Cited

U.S. PATENT DOCUMENTS

| | | | |
|---|---|---|---|
| 2011/0316494 A1* | 12/2011 | Kitamura | H02M 1/088 |
| | | | 323/229 |
| 2015/0155776 A1* | 6/2015 | Castelli | H02M 1/4208 |
| | | | 323/205 |
| 2017/0045555 A1* | 2/2017 | Liu | G01R 15/183 |
| 2017/0110981 A1* | 4/2017 | Deboy | H02M 7/217 |
| 2017/0310210 A1* | 10/2017 | Bianco | H02M 1/4225 |

* cited by examiner

SWITCHING POWER SUPPLY WITH A MEASURING AND CALCULATING PROCESS FOR THE SWITCHING TIMES

FIELD OF THE INVENTION

The present invention relates to a switching power supply that is equipped with a power converter, which includes a series circuit composed of a switch and a boost inductor to which an input voltage is applied, and a synchronous rectifier connected to a junction between the switch and the boost inductor, the power converter converting the input voltage to an output voltage that is outputted.

DESCRIPTION OF THE RELATED ART

As one example of a switching power supply of this type, the switching power supply (or "converter") disclosed in Patent Literature 1 (Japanese Translation of PCT International Application Publication No. 2017-505097) is known. This switching power supply is configured as a bridgeless totem pole power factor correction converter. When the polarity of the AC input voltage is positive, the AC input voltage is applied to a series circuit composed of a boost inductor (or simply "inductor") and a low-side switch (that is, a low-side switch that is connected to the low-voltage side of the DC output voltage and has a body diode), the low-side switch functions as an active switch (in other words, a switch that causes energy to accumulate in the boost inductor), and a high-side switch (that is, a high-side switch that is connected to the high-voltage side of the DC output voltage and includes a body diode) that is connected to a junction between the boost inductor and the low-side switch operates as a synchronous rectifier (in other words, a freewheeling switch that causes the boost inductor to release the accumulated energy). Conversely, when the polarity of the AC input voltage is negative, the AC input voltage is applied to a series circuit composed of the boost inductor (or simply "inductor") and the high-side switch, the high-side switch functions as an active switch, and the low-side switch that is connected to a junction between the boost inductor and the high-side switch operates as a synchronous rectifier.

In this switching power supply, to promote zero voltage switching at the active switch, the on time Tb of the freewheeling switch is decided according to an equilibrium relationship (|Vac|×Ta)/(Vo−|Vac|) for volts×seconds (a value known as the "ET product") in the switching cycle. Note that "Ta" is the on time of the active switch, "|Vac|" is the absolute voltage of the AC input voltage, and "Vo" is the DC output voltage value. The on time Tb decided in this way is adjusted (that is, increased and decreased) for the next switching cycle based on the active switch voltage Vds across both ends of the active switch.

As one example, the decided on time Tb (=|Vac|×Ta/(Vo−|Vac|)) of the freewheeling switch for the next switching cycle is increased when the voltage Vds of the freewheeling switch at the end of the on time Tb in the present switching cycle exceeds a threshold set in advance, is decreased when the active switch voltage is negative, and is maintained without increasing or decreasing when the voltage Vds is equal to or above zero and equal to or below the threshold. In this switching power supply, by correcting the on time Tb of the freewheeling switch in this way, the voltage Vds at a point where the on time Tb has elapsed is maintained in a voltage range that is equal to or above zero and equal to or below the threshold. This means that zero voltage switching is promoted at the active switch.

SUMMARY OF THE INVENTION

However, the conventional switching power supply described above has the following problem. In this switching power supply, the voltage value of a voltage (active switch voltage) across both ends of the low-side switch (or "active switch") that fluctuates between a high voltage (a voltage that is equal to the output voltage Vo) and a low voltage (a voltage near the threshold) needs to be accurately measured with no delay when the on time Tb has elapsed. In reality, a dedicated controller with a high withstand voltage is required to accurately perform this measurement, and such dedicated controllers are normally expensive. Accordingly, this switching power supply has a problem of an increase in equipment cost. In the switching power supply, to completely release the charge in the electrostatic capacitance between the drain and source before the active switch is turned on, control is performed so that the freewheeling switch is kept on even after the inductor current starts flowing in the opposite direction. However, since the inductor current flows backward after the electromotive force of the boost inductor becomes zero (that is, after the discharging of energy has been completed), in a switching power supply that uses this configuration where control is performed to keep the freewheeling switch on even after the inductor current has started flowing backward, in addition to the current produced by discharging of the electrostatic capacitance between the drain and source, there is the current that flows backward from the output side toward the input side as an inductor current, which causes a loss. For this reason, there is demand for a technology capable of correcting the on time of a freewheeling switch more appropriately.

The present invention was conceived in view of the problem described above and has a principal object of providing a switching power supply capable of appropriately correcting the on time of a freewheeling switch (or "synchronous rectifier") while avoiding measurement of the voltage across both ends of a switch (such as a FET).

SUMMARY OF THE INVENTION

To achieve the stated object, a switching power supply according to the present invention comprises: a power converter that includes a series circuit with a boost inductor, to which an input voltage Vi is applied, and a switch, and a synchronous rectifier connected to a junction between the boost inductor and the switch, and converts the input voltage Vi to an output voltage Vo which is outputted; a zero current detector that includes a detection winding, which is magnetically coupled to the boost inductor and outputs a zero current detection signal whose voltage value changes in proportion to a voltage across the boost inductor, and detects zero timing at which an inductor current flowing in the boost inductor becomes zero; a controller that executes an on/off control process that sets the switch in an on state based on the zero timing, causes energy to accumulate in the boost inductor, switches the switch from the on state into an off state, then sets the synchronous rectifier in a synchronous rectification state to have the energy discharged from the boost inductor to cause the power converter to output the output voltage Vo; and a voltage meter that measures the input voltage Vi and the output voltage Vo, wherein the controller causes a second on period T2, where the synchronous rectifier is set in the synchronous rectification state, to end before the zero timing by executing: a first measuring process that measures a first on period T1 where the switch is set in an on state; a second on period calculating process that calculates, when a correction time for the second on period T2 is expressed as "Tc", the second on period T2 according to a following expression $$T2=T1\times |Vi|/(Vo-|Vi|)-Tc;$$

the on/off control process that sets the synchronous rectifier in the synchronous rectification state for only the second on period T2 calculated by the second on period calculating process; a second measuring process that measures an elapsed time from an end of the second on period T2 to a start of the first on period T1; and a correction time changing process that changes the correction time Tc so that the elapsed time measured by the second measuring process becomes a target time set in advance.

According to the switching power supply described above, it is possible, while avoiding measurement of a voltage at a junction between the boost inductor and the switch (that is, the voltage across both ends of the switch, or the drain-source voltage when the switch is a FET), to appropriately correct the length of a period where a synchronous rectifier is switched on and to reliably avoid an increase in an inductor current in a negative direction (that is, the direction from the output side toward the input side) which would occur if the synchronous rectifier were kept in the on state even after the timing at which the inductor current becomes zero.

Also, in the switching power supply according to the present invention, during the correction time changing process, the controller calculates, when the correction time Tc used when calculating a length T2 of the second on period T2 in an immediately preceding execution of the second on period calculating process is expressed as $Tc_{n-1}$, the target time is expressed as target time Ttg, and the elapsed time Td2 measured in an immediately preceding execution of the second measuring process is expressed as $Td2_{n-1}$, the correction time Tc as a new correction time $Tc_n$ based on a following equation to change the correction time Tc used in the second on period calculating process executed following the correction time changing process.

$$Tc_n=Tc_{n-1}+Ttg-Td2_{n-1}$$

This means that according to the switching power supply, even if the elapsed time $Td2_{n-1}$ of the immediately preceding measurement was different to the target time Ttg, it is still possible to calculate the next correction time $Tc_n$ based on the equation described above (that is, to calculate the next correction time $Tc_n$ by correcting the correction time $Tc_{n-1}$ used when calculating the immediately preceding second on period T2 by the difference between the two times) and to use this correction time $Tc_n$ when calculating the next second on period T2, thereby making it possible to match the next elapsed time $Td2_n$ to be calculated by the next second measuring process to the target time Ttg.

It should be noted that the disclosure of the present invention relates to the contents of Japanese Patent Application No. 2018-075820 that was filed on Apr. 11, 2018, the entire contents of which are herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a switching power supply will now be described with reference to the attached drawings. In these embodiments, a bridgeless totem pole power factor correction converter will be described as one example of a switching power supply.

First, the configuration of a bridgeless totem pole power factor correction converter 1 (hereinafter simply "converter 1") will be described with reference to the drawings.

Figure 1:
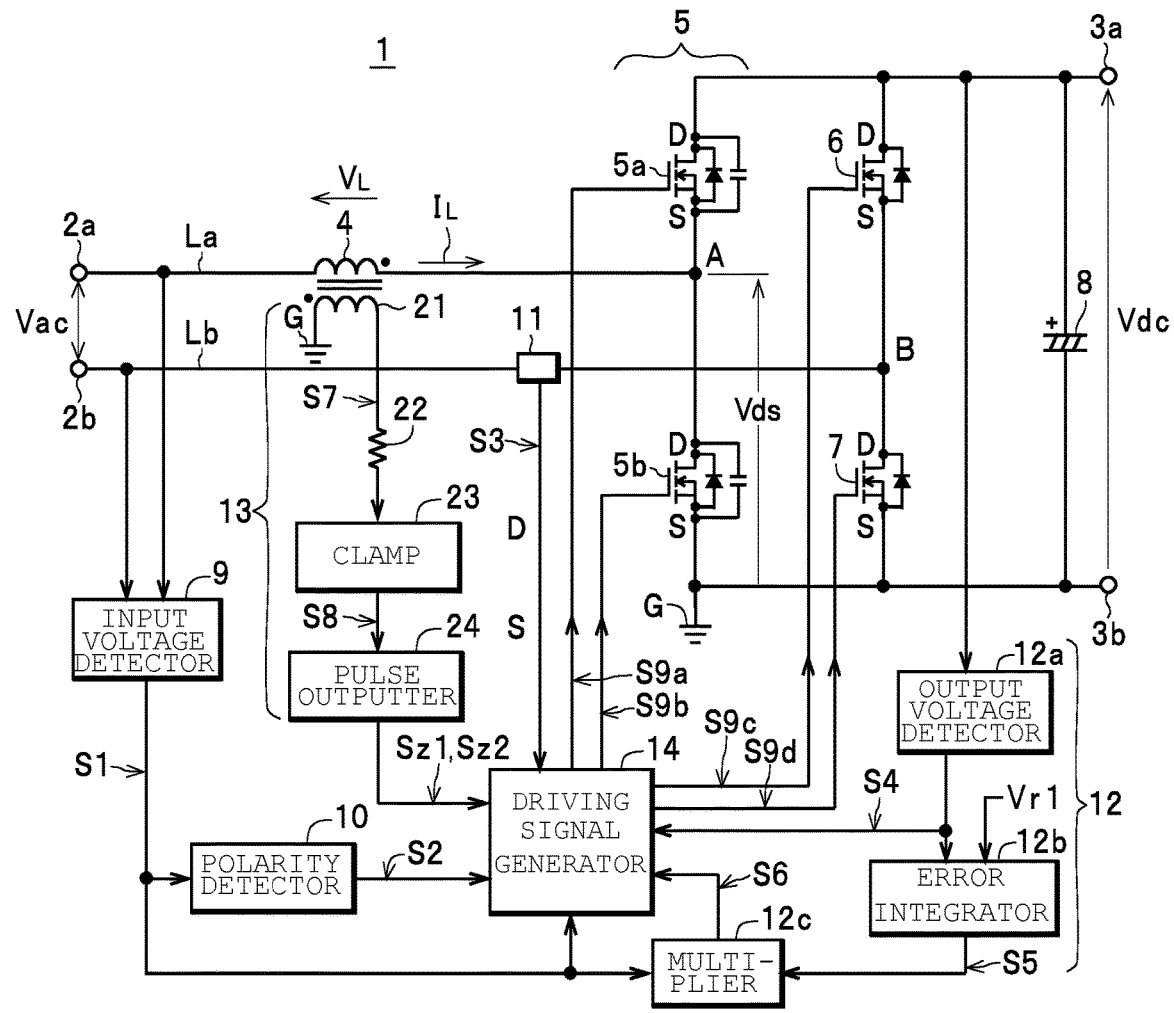
FIG. 1 is a block diagram of a bridgeless totem pole power factor correction converter.

As depicted in FIG. 1, the converter 1 includes a pair of input terminals 2a and 2b (hereinafter collectively referred to as the "input terminals 2" when no distinction is made between them), a pair of output terminals 3a and 3b (hereinafter collectively referred to as the "output terminals 3" when no distinction is made between them), a boost inductor 4, a switching circuit 5, two rectifiers 6 and 7, a smoothing capacitor 8, an input voltage detector 9, a polarity detector 10, a current detector 11, a target current signal generator 12, a zero current detector 13, and a driving signal generator 14. The converter 1 is configured so as to operate in current critical mode, convert an input voltage Vi (in the present embodiment, an AC input voltage Vac (an AC voltage such as AC 100V with a frequency, such as 50 Hz or 60 Hz, used for commercial power) inputted across the input terminals 2 to an output voltage Vo (in the present embodiment, a DC output voltage Vdc (a voltage that exceeds the maximum value of the AC input voltage Vac)), and output the DC output voltage Vdc across the output terminals 3. The DC output voltage Vdc is outputted from the output terminals 3a and 3b in a state where one output terminal 3a out of the pair of output terminals 3a and 3b has a positive potential with the potential of the other output terminal 3b as a reference (or "reference potential" (as one example in the present embodiment, the ground G potential (or "zero voltage")) with the DC output voltage Vdc being smoothed by the smoothing capacitor 8 connected between the pair of output terminals 3a and 3b. As one example in the present embodiment, a case where the AC input voltage Vac is AC 100V and the DC output voltage Vdc is DC 400V is described below. Note that in the present embodiment, for ease of understanding, the expressions "input voltage Vi", "AC input voltage Vac", "output voltage Vo", and "DC output voltage Vdc" are assumed to indicate both the names of the signals and the voltage values of such signals.

In more detail, as one example, the boost inductor 4 is constructed of a magnetic core and a coil wound around the magnetic core, and is inserted on at least one of a power line La that connects one input terminal (as one example in the present embodiment, the input terminal 2a) out of the pair of input terminals 2 and the switching circuit 5 and a power line Lb that connects the other input terminal (as one example in the present embodiment, the input terminal 2b) out of the pair of input terminals 2 and the two rectifiers 6 and 7. Although the boost inductor 4 is inserted on only the power line La as one example in the present embodiment, the present invention is not limited to this configuration and it is also possible to use a configuration where the boost inductor 4 is inserted on only the power line Lb and a configuration where boost inductors 4 are inserted on both output lines La and Lb.

The switching circuit 5 is constructed of a pair of switches 5a and 5b that are connected in a totem pole and are connected across the pair of output terminals 3. As one example in the present embodiment, the switches 5a and 5b are constructed of n channel MOSFETs (Metal-Oxide-Semiconductor Field-Effect Transistors, hereinafter simply referred to as "FETs") that incorporate body diodes, the source terminal of the high-side switch 5a and the drain terminal of the low-side switch 5b are connected at a junction A, the drain terminal of the high-side switch 5a is connected to the high potential-side output terminal 3a, and the source terminal of the low-side switch 5b is connected to the output terminal 3b that becomes the zero voltage. Note that instead of MOSFETs, the switches 5a and 5b may be constructed of HEMT (High Electron Mobility Transistors), IGBT (Insulated Gate Bipolar Transistors), or bi-polar transistors.

The switches 5a and 5b are alternately driven to perform an on/off operation (that is, a switching operation) using a driving signal S9a supplied from the driving signal generator 14 to the high-side switch 5a and a driving signal S9b supplied from the driving signal generator 14 to the low-side switch 5b.

By doing so, if the AC input voltage Vac has positive polarity, during an on state of the switch 5b (that is, the switch that functions as an active switch in the converter described in the background art), since energy accumulates in the boost inductor 4, a voltage $V_L$ ("+|Vac|"=141V) (note that a voltage in this direction (that is, the direction depicted in FIG. 1) or with this polarity is referred to in the specification as being in the "positive (+) direction") such that the input terminal 2a-side end of the boost inductor 4 becomes a high potential compared to the voltage at the junction A-side end of the boost inductor 4 that becomes the equivalent of the ground G potential (that is, the zero voltage) is applied across the boost inductor 4, and an increasing inductor current $I_L$ flows from the input terminal 2a via the switch 5b in the on state toward the input terminal 2b (it is assumed here that a current flowing in this direction (the direction of the arrow in FIG. 1) is in the "positive (+) direction"). On the other hand, when the switch 5b is off, since energy is discharged from the boost inductor 4, a voltage $V_L$ (−(Vdc−|Vac|)) (note that a voltage in this direction or with this polarity is referred to here as being in the "negative (−) direction") such that the input terminal 2a-side end of the boost inductor 4 becomes a low potential compared to the voltage at the junction A-side end of the boost inductor 4 that reaches the equivalent of the DC output potential (Vdc) is generated across the boost inductor 4, and a decreasing inductor current $I_L$ (that is, a current in the positive (+) direction) flows from the input terminal 2a via the switch 5a (that is, the switch that functions as a freewheeling switch in the converter described in the background art, when the switch 5a is an n-channel MOSFET that incorporates a body diode, the switch 5a itself when the switch 5a is on (that is, the switch 5a is functioning as a synchronous rectifier) or the body diode when the switch 5a is off) toward the output terminal 3a. The inductor current $I_L$ becomes zero when the discharging of energy from the boost inductor 4 is complete. At such time, since the potential of the junction A-side end is the voltage Vdc (a charging voltage of the output capacitance of the switch 5b), the voltage $V_L$ across the boost inductor 4 becomes the voltage (−(Vdc−|Vac|)). Immediately after this however, the voltage $V_L$ across the boost inductor 4 rapidly rises in the positive (+) direction due to discharging of the output capacitance of the switch 5b and charging of the output capacitance of the switch 5a. The current caused by the discharging of the output capacitance of the switch 5b and the current caused by the charging of the output capacitance of the switch 5a also flow in the opposite direction (that is, the negative (−) direction) as the inductor current $I_L$ to the boost inductor 4. Accordingly, when the AC input voltage Vac has positive polarity, the timing at which the inductor current $I_L$ flowing in the boost inductor 4 becomes zero is synchronized with the timing of rises (or "rising edges", that is, "rising edges of a zero current detection signal S7", described later) in the voltage $V_L$ across the boost inductor 4.

Meanwhile, if the AC input voltage Vac has negative polarity, during an on state of the switch 5a which functions as an active switch, since energy accumulates in the boost inductor 4, a voltage $V_L$ (−|Vac|) in the negative (−) direction such that the input terminal 2a-side end of the boost inductor 4 becomes a low potential compared to the voltage at the junction A-side end of the boost inductor 4 that becomes the equivalent of the DC output potential (Vdc) is applied across the boost inductor 4, and an increasing inductor current $I_L$ (a current in the "negative (−) direction") flows from the input terminal 2b via the switch 5a in the on state toward the input terminal 2a. On the other hand, when the switch 5a is off, since energy is discharged from the boost inductor 4, a voltage $V_L$ (+(Vdc−|Vac|), a voltage in the "positive (+) direction") such that the input terminal 2a-side end of the boost inductor 4 becomes a high potential compared to the voltage at the junction A-side end of the boost inductor 4 that reaches the equivalent of the ground G potential (or "zero voltage") is generated across the boost inductor 4, and a decreasing inductor current $I_L$ (that is, a current in the negative (−) direction) flows from the output terminal 3b via the switch 5b that functions as a freewheeling switch (when the switch 5b is an n-channel MOSFET that incorporates a body diode, the switch 5b itself when the switch 5b is on (that is, the switch 5b is functioning as a synchronous rectifier) or the body diode when the switch 5b is off) toward the input terminal 2a. The inductor current $I_L$ becomes zero when the discharging of energy from the boost inductor 4 is complete. At such time, since the voltage at the junction A-side becomes the equivalent of the ground G potential (the zero voltage), the voltage $V_L$ across the boost inductor 4 becomes (+(Vdc−|Vac|)). Immediately after this however, the voltage $V_L$ across the boost inductor 4 rapidly falls in the negative (−) direction due to discharging of the output capacitance of the switch 5a and charging of the output capacitance of the switch 5b. A current caused by the discharging of the output capacitance of the switch 5a and a current caused by the charging of the output capacitance of the switch 5b also flow in the opposite direction (the positive (+) direction) as the inductor current $I_L$ to the boost inductor 4. Accordingly, when the AC input voltage Vac has negative polarity, the timing at which the inductor current $I_L$ flowing in the boost inductor 4 reaches zero is synchronized with the timing of falls (or "falling edges", that is, "falling edges of the zero current detection signal S7", described later) of the voltage $V_L$ across the boost inductor 4.

The two rectifiers 6 and 7 are connected to each other in series with the same forward direction and are connected in parallel to the switching circuit 5. As one example in the present embodiment, the rectifiers 6 and 7 are constructed of n-channel MOSFETs that incorporate body diodes, and by connecting a current output end of the entire rectifier 6 and 7 configuration (that is, the drain terminal of the MOSFET that constructs the rectifier 6) to the output terminal 3a and connecting the current input end of the entire rectifier 6 and 7 configuration (that is, the source terminal of the MOSFET that constructs the rectifier 7) to the output terminal 3b, the rectifiers 6 and 7 are connected in parallel to the switching circuit 5. The rectifier 6 (hereinafter also referred to as the "FET 6") is driven by a driving signal S9c supplied from the driving signal generator 14 so as to always be in an off state during a period where the AC input voltage Vac has positive polarity and to always be in an on state during a period where the AC input voltage Vac has negative polarity. Likewise, the rectifier 7 (hereinafter also referred to as the "FET 7") is driven by a driving signal S9d supplied from the driving signal generator 14 so as to always be in an on state during a period where the AC input voltage Vac has positive polarity and to always be in an off state during a period where the AC input voltage Vac has negative polarity. Note that instead of MOSFETs, it is also possible to construct the rectifiers 6 and 7 of diodes that are connected in series with the same polarity as the body diodes of the MOSFETs depicted in FIG. 1. The smoothing capacitor 8 is constructed of an electrolytic capacitor, for example.

In the converter 1 according to the present embodiment, the boost inductor 4, the switches 5a and 5b, the FETs 6 and 7, and the smoothing capacitor 8 described above construct a totem pole-type power converter (that is, a converter that converts the AC input voltage Vac as the input voltage Vi to the DC output voltage Vdc as the output voltage Vo which is outputted). As described above, this power converter is configured so that when the AC input voltage Vac has positive polarity, the AC input voltage Vac is applied to a series circuit composed of the boost inductor 4 and the switch 5b and the switch 5a that functions as a synchronous rectifier is connected to the junction A between the boost inductor 4 and the switch 5b. Meanwhile, when the AC input voltage Vac has negative polarity, the AC input voltage Vac is applied to a series circuit composed of the boost inductor 4 and the switch 5a and the switch 5b that functions as a synchronous rectifier is connected to the junction A between the boost inductor 4 and the switch 5b.

As one example, the input voltage detector 9 is constructed of an operational amplifier that operates on positive and negative power supply voltages outputted from positive and negative auxiliary power supplies. The input voltage detector 9 inputs the AC input voltage Vac, amplifies the AC input voltage Vac by an amplification factor set in advance (that is, an amplification factor that is below 1 so as to lower the voltage to a voltage that can be handled by the following circuits), and converts to and outputs an AC voltage signal S1 that has the ground G potential (that is, the zero voltage) as a reference. The AC voltage signal S1 is a sinusoidal signal that is synchronized with and has the same polarity as the AC input voltage Vac.

Figure 3:
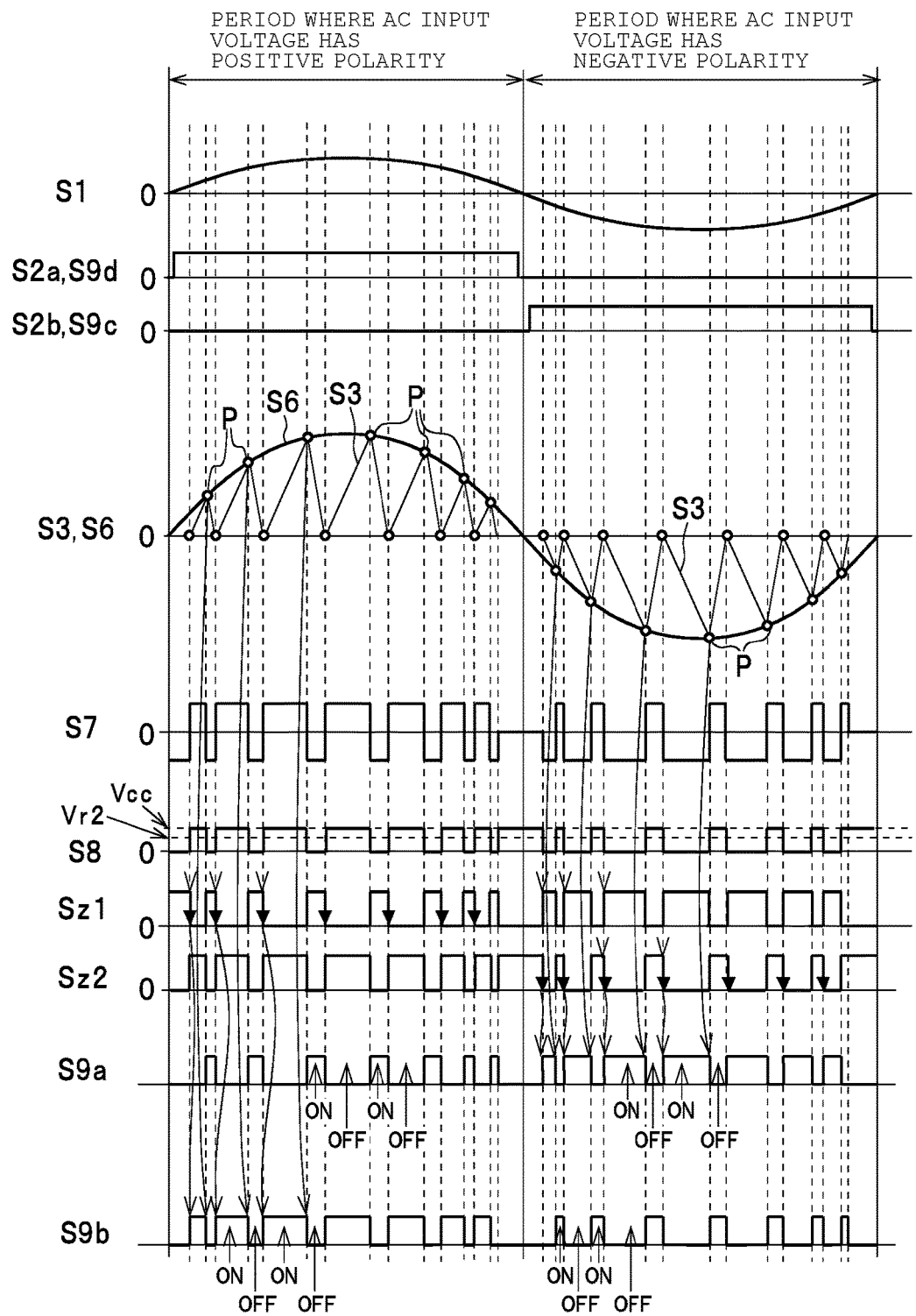
FIG. 3 is a waveform diagram useful in explaining the operations of the zero current detector circuit and the converter.

As one example, the polarity detector 10 is constructed of a comparator that compares the AC voltage signal S1 and the ground G potential (that is, the zero voltage) and outputs a polarity signal S2 indicating the polarity of the AC voltage signal S1 (as one example, as depicted in FIGS. 1 and 3, a polarity signal S2a indicating that the AC voltage signal S1 has positive polarity and a polarity signal S2b indicating that the AC voltage signal S1 has negative polarity). The current detector 11 is constructed of a Hall element or a current transformer, and is disposed on one of the power lines La and Lb. The current detector 11 detects the inductor current $I_L$ flowing in the boost inductor 4 and outputs a current detection signal S3 whose voltage value changes in proportion to the current value of the inductor current $I_L$ and whose polarity changes according to the polarity of the inductor current $I_L$.

As depicted in FIG. 1 for example, the target current signal generator 12 includes an output voltage detector 12a, an error integrator 12b, and a multiplier 12c. The output voltage detector 12a is constructed of a voltage-dividing resistance circuit for example and outputs a voltage detection signal S4 whose voltage value changes in proportion to the DC output voltage Vdc (that is, a signal whose voltage is lowered to a voltage that can be handled by the following circuits and has the ground G potential (the zero voltage) as a reference). As one example, the error integrator 12b is constructed of an integrating circuit that uses an operational amplifier, integrates the difference (error) between the voltage detection signal S4 and a target reference voltage Vr1 indicating a target voltage for the DC output voltage Vdc, and outputs an error integral signal S5. By inputting and multiplying the error integral signal S5 and the AC voltage signal S1, the multiplier 12c generates and outputs a target current signal S6. As depicted in FIG. 3, the target current signal S6 generated in this way is a sinusoidal signal to be traced by the envelope of a peak current value P of the current detection signal S3 that indicates the triangular inductor current $I_L$ flowing in the boost inductor 4.

Note that although the above description uses a target current signal generator 12 configuration where operations are performed on the positive AC voltage signal S1, the target current signal S6, and the current detection signal S3 during a period where the AC input voltage Vac has positive polarity relative to the ground G potential (the zero voltage) as a reference and operations are performed on the negative AC voltage signal S1, the target current signal S6, and the current detection signal S3 during a period where the AC input voltage Vac has negative polarity, in place of this configuration, it is also possible to use a configuration that superimposes positive offset voltages onto the AC voltage signal S1, the target current signal S6, and the current detection signal S3 across their entire periods (that is, a configuration that converts these signals into DC signals). It is also possible to use a configuration where the signs of the AC voltage signal S1, the target current signal S6, and the current detection signal S3 are all left unchanged during a period where the AC input voltage Vac has positive polarity and the signs of the AC voltage signal S1, the target current signal S6, and the current detection signal S3 are all inverted (that is, the signals are converted to positive polarity signals) during a period where the AC input voltage Vac has negative polarity. By using such configurations, it is possible to produce a configuration where all of the control circuits including the zero current detector 13 operate on only a positive power supply voltage that has a reference potential (for example, the zero voltage) as a reference (that is, a configuration that operates on a single power supply). Doing so makes it possible to simplify the power supply configuration.

Figure 2:
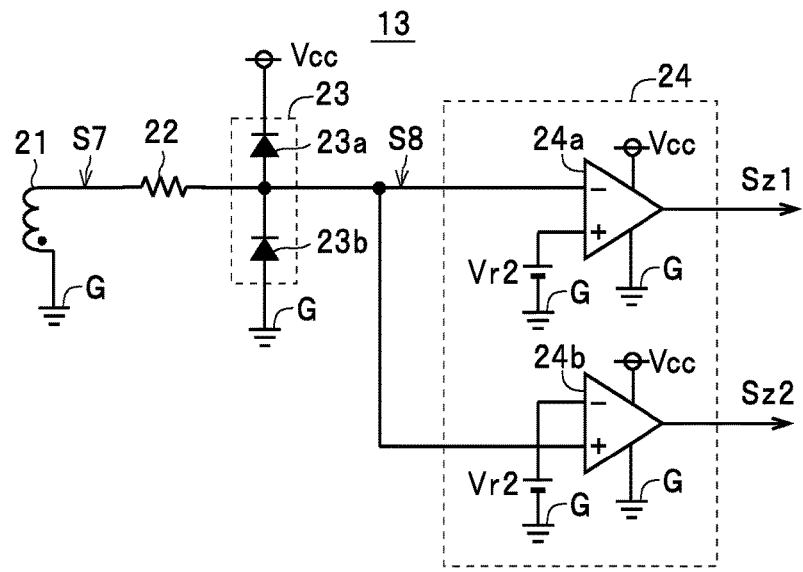
FIG. 2 is a circuit diagram of a zero current detector circuit appearing in FIG. 1.

As depicted in FIGS. 1 and 2, the zero current detector circuit 13 includes one detection winding 21, a resistor 22, a clamp 23, and a pulse outputter 24. The detection winding 21 is magnetically coupled to the boost inductor 4, has one end directly connected to the ground G potential (zero voltage) as a reference potential, and generates a zero current detection signal S7 whose voltage value changes in proportion to the voltage $V_L$ across both ends of the boost inductor 4a at the other end. As one example in the present embodiment, the detection winding 21 is wound together with the winding that constructs the boost inductor 4 and with the polarity depicted in FIG. 1 around the magnetic core of the boost inductor 4, and is assumed to have a number of turns set at 1/k times the number of turns of the winding that construct the boost inductor 4 (where k is a number that exceeds 1 but is not limited to an integer, for example 10). The resistor 22 has one end connected to the other end of the detection winding 21.

The clamp 23 clamps the zero current detection signal S7 inputted via the resistor 22 using two clamp voltages (that is, the reference potential and a positive constant voltage) to convert the zero current detection signal S7 to a rectangular signal S8 which is outputted. More specifically, as depicted in FIG. 2, the clamp 23 is constructed of two diodes 23a and 23b that are connected to each other in series with the same forward direction. A junction between the two diodes 23a and 23b is connected to the other end of the resistor 22. A current input end of the entire diode 23a and 23b configuration (in the present embodiment, the anode terminal of the diode 23b) is connected to the ground G potential (that is, the zero voltage as a lower limit voltage) as a reference potential and a current output end of the entire configuration (in the present embodiment the cathode terminal of the diode 23a) is connected to a positive constant voltage (as one example in the present embodiment, the positive power supply voltage Vcc that is outputted from a positive auxiliary power supply as an upper limit voltage, a constant voltage of around 3 to 5V. By using this configuration, when, for ease of understanding, the forward voltage of the diodes 23a and 23b is assumed to be negligible (that is, zero volts), the clamp 23 outputs the rectangular signal S8 with the minimum voltage of the zero current detection signal S7 clamped to the zero voltage (that is, zero volts) as one clamping voltage and the maximum voltage clamped to the positive power supply voltage Vcc as the other clamping voltage.

The pulse outputter 24 includes a comparator that compares the rectangular signal S8 with a comparison voltage Vr2 that is set between the zero voltage as a reference potential and the positive constant voltage (the two clamping voltages described above at the clamp 23 (the upper limit voltage and the lower limit voltage)) and outputs detection pulses whose edges, which are one of rising edges and falling edges, are synchronized with the timing at which the inductor current $I_L$ flowing in the boost inductor 4 becomes zero. As one example in the present embodiment, as depicted in FIG. 2, the pulse outputter 24 includes two comparators, that is, a first comparator 24a and a second comparator 24b that operate on a positive power supply voltage Vcc which has the ground G potential (the zero voltage) as a reference (that is, the comparators operate on a single power supply provided by a positive auxiliary power supply). The comparison voltage Vr2 is inputted into the plus input terminal of the first comparator 24a and the rectangular signal S8 is inputted into the minus input terminal. The rectangular signal S8 is inputted into the plus input terminal of the second comparator 24b and the comparison voltage Vr2 is inputted into the minus input terminal.

With this configuration, due to the first comparator 24a comparing the rectangular signal S8 with the comparison voltage Vr2, the pulse outputter 24 outputs detection pulses (or "first detection pulses Sz1") that become a high level (the positive power supply voltage Vcc) when the rectangular signal S8 is below the comparison voltage Vr2 and become a low level (zero volts) when the rectangular signal S8 is above the comparison voltage Vr2. Since the first detection pulses Sz1 are a pulse signal with inverse phase to the rectangular signal S8 and also the zero current detection signal S7 and the voltage $V_L$ (that is, the first detection pulses Sz1 are a signal whose rising edges effectively match falling edges in the other signals and whose falling edges effectively match the rising edges in the other signals), the falling edges of the first detection pulses Sz1 are synchronized with the timing of rises in the voltage $V_L$ when the AC input voltage Vac has positive polarity, which is to say, the timing (or "zero timing") where the inductor current $I_L$ flowing in the boost inductor 4 becomes zero.

Similarly, the second comparator 24b compares the rectangular signal S8 with the comparison voltage Vr2 and outputs detection pulses (or "second detection pulses Sz2") that become a low level when the rectangular signal S8 is below the comparison voltage Vr2 and become a high level when the rectangular signal S8 is above the comparison voltage Vr2. Since the second detection pulses Sz2 are a pulse signal with the same phase as the rectangular signal S8 and also the zero current detection signal S7 and the voltage $V_L$ (that is, the rising edges of these signals effectively match and the falling edges of these signals effectively match), the falling edges of the second detection pulses Sz2 are synchronized with the timing of falls in the voltage $V_L$ when the AC input voltage Vac has negative polarity, which is to say, the timing (or "zero timing") where the inductor current $I_L$ flowing in the boost inductor 4 becomes zero.

The driving signal generator 14 is constructed as a controller including a DSP and/or a CPU, for example, and based on the first detection pulses Sz1, the second detection pulses Sz2, the current detection signal S3, the polarity signal S2, and the target current signal S6, performs on/off control processing that generates and outputs a driving signal S9a for on/off driving of the switch 5a (a signal that is applied across the gate and source terminals of the FET that constructs the switch 5a), a driving signal S9b for on/off driving of the switch 5b (a signal that is applied across the gate and source terminals of the FET that constructs the switch 5b), a driving signal S9c for on/off driving of the FET 6 (a signal applied across the gate and source terminals of the FET 6), and a driving signal S9d for on/off driving of the FET 7 (a signal applied across the gate and source terminals of the FET 7).

Figure 4:
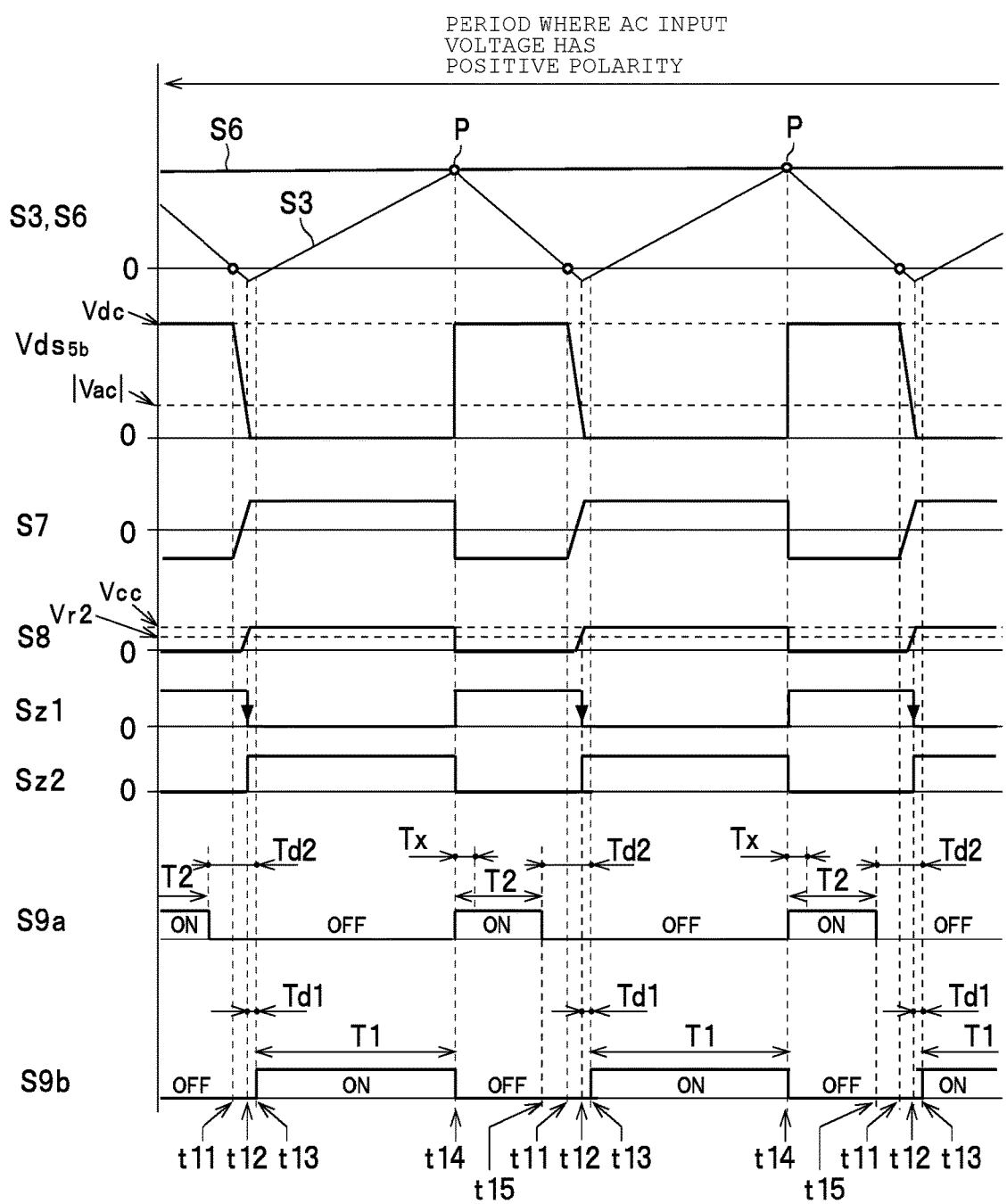
FIG. 4 is a waveform diagram useful in explaining control operations of switches when an AC input voltage has positive polarity.

To cause the power converter including the switches 5a and 5b to operate in current critical mode, the driving signal generator 14 determines the polarity of the AC input voltage Vac based on the polarity signal S2 and, by generating and outputting, when the AC input voltage Vac has positive polarity (that is, when the polarity signal S2a is being outputted), the driving signal S9c that has a low level and the driving signal S9d that has a high level as depicted in FIG. 3, keeps the FET 6 always in the off state and the FET 7 always in the on state. As depicted in FIGS. 3 and 4, by repeating an operation of switching from the low level to the high level in synchronization with a falling edge of the first detection pulses Sz1 and then switching from the high level to the low level when the level of the current detection signal S3 has reached the target current signal S6 (that is, when the current value of the inductor current $I_L$ indicated by the current detection signal S3 has reached the target current value indicated by the target current signal S6), the driving signal generator 14 generates and outputs the driving signal S9b to the switch 5b that functions as an active switch when the AC input voltage Vac has positive polarity. Similarly, by repeating an operation of switching the driving signal S9a from the low level to the high level in synchronization with the driving signal S9b switching from the high level to the low level (that is, in synchronization with a state where dead time is provided relative to the driving signal S9b) and after this, as depicted in FIG. 4, switching the driving signal S9a from the high level to the low level at a time when a second on period T2 calculated as described later has elapsed, the driving signal generator 14 generates and outputs the driving signal S9a to the switch 5a that functions as a freewheeling switch when the AC input voltage Vac has positive polarity. Note that the labels "ON" and "OFF" attached to the waveforms of the driving signals S9a and S9b in FIG. 4 indicate the on and off states of the corresponding switches 5a and 5b.

Figure 5:
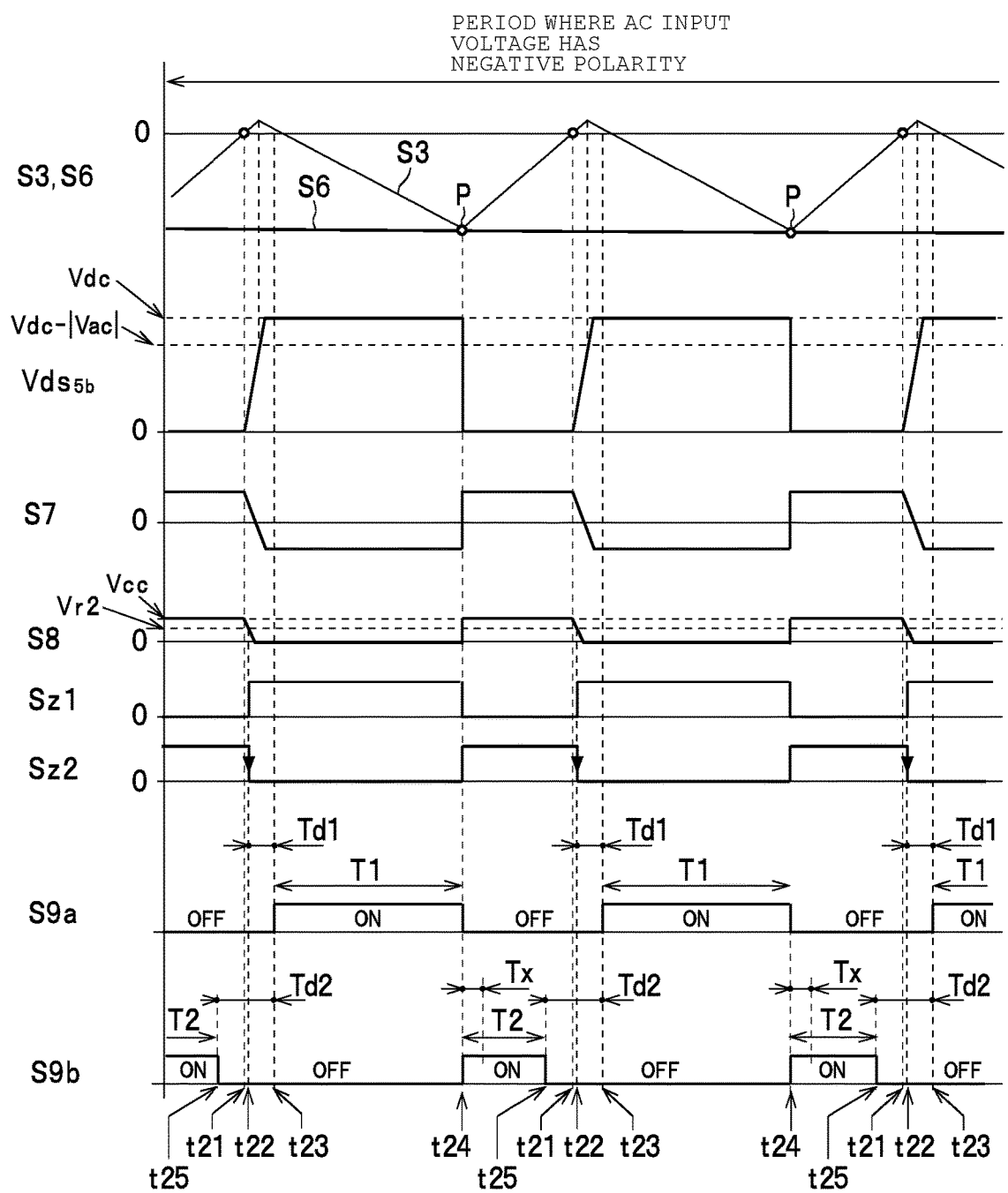
FIG. 5 is a waveform diagram useful in explaining control operations of the switches when the AC input voltage has negative polarity.

When the AC input voltage Vac has negative polarity (that is, when the polarity signal S2b is being outputted), the driving signal generator 14 generates and outputs the driving signal S9c with the high level and the driving signal S9d with the low level as depicted in FIG. 3 to keep the FET 6 always in the on state and the FET 7 always in the off state. Also, as depicted in FIGS. 3 and 5, by repeating an operation of switching the driving signal S9a from the low level to the high level in synchronization with a falling edge of the second detection pulses Sz2 and then switching from the high level to the low level when the level of the current detection signal S3 has reached the target current signal S6 (that is, when the current value of the inductor current $I_L$ indicated by the current detection signal S3 has reached the target current value indicated by the target current signal S6), the driving signal generator 14 generates and outputs the driving signal S9a for the switch 5a that functions as an active switch when the AC input voltage Vac has negative polarity. Similarly, by repeating an operation of switching the driving signal S9b from the low level to the high level in synchronization with the driving signal S9a switching from the high level to the low level (that is, in synchronization with a state where dead time is provided relative to the driving signal S9a) and after this, as depicted in FIG. 5, switching the driving signal S9b from the high level to the low level at a time when a second on period T2 calculated as described later has elapsed, the driving signal generator 14 generates and outputs the driving signal S9b for the switch 5b that functions as a freewheeling switch when the AC input voltage Vac has negative polarity. Note that the labels "ON" and "OFF" attached to the waveforms on the driving signals S9a and S9b in FIG. 5 indicate the on and off states of the corresponding switches 5a and 5b.

The driving signal generator 14 functions as a voltage meter, measures the AC input voltage |Vac| based on the AC voltage signal S1 outputted from the input voltage detector 9, and measures the DC output voltage Vdc based on the voltage detection signal S4 outputted from the output voltage detector 12a. The driving signal generator 14 executes a first measuring process that measures a first on period T1 where the switch that functions as an active switch (when the AC input voltage Vac has positive polarity, the switch 5b, and when the AC input voltage Vac and negative polarity, the switch 5a) is turned on, a second on period calculating process that calculates, according to Equation (1) below, the second on period T2 where the synchronous rectifier (when the AC input voltage Vac has positive polarity, the switch 5a, and when the AC input voltage Vac has negative polarity, the switch 5b) that functions as a freewheeling switch is set in a synchronous rectification state, a second measuring process that measures an elapsed time Td2 from the end of the second on period T2 to the start of the first on period T1, and a correction time changing process that calculates and changes, from Equation (2) described later, the correction time Tc used in Equation (1) so that the elapsed time Td2 measured by the second measuring process becomes a target time Ttg (or "fixed time") set in advance.

$$T2 = T1 \times |Vac|/(Vdc - |Vac|) - Tc \qquad (1)$$

Note that Tc is the correction time for the second on period T2.

Next, the operation of the converter 1 will be described with reference to the attached drawings.

In the converter 1, as described above, the input voltage detector 9 inputs the AC input voltage Vac inputted across the pair of input terminals 2, converts, as depicted in FIG. 3, the AC input voltage Vac to the AC voltage signal S1 that has the ground G potential (that is, the zero voltage) as a reference, and outputs the AC voltage signal S1. Also, as depicted in FIG. 3, based on the AC voltage signal S1, the polarity detector 10 outputs the polarity signals S2a and S2b indicating the polarity of the AC voltage signal S1 (that is, the polarity of the AC input voltage Vac).

Due to the FETs 6 and 7 alternately performing on/off operations in synchronization with the cycles of the AC input voltage Vac based on the driving signals S9c and S9d outputted form the driving signal generator 14 and the switches 5a and 5b performing on/off operations (that is, operating in current critical mode) based on the driving signals S9a and S9b outputted from the driving signal generator 14, the AC input voltage Vac inputted across the input terminals 2 is converted to the DC output voltage Vdc and outputted across the output terminals 3.

The current detector 11 outputs the current detection signal S3 whose voltage value changes in proportion to the current value of the inductor current $I_L$ flowing in the boost inductor 4 and whose polarity changes in accordance with the polarity of the inductor current $I_L$. As described above, based on the DC output voltage Vdc, the target reference voltage Vr1, and the AC voltage signal S1, as depicted in FIG. 3, the target current signal generator 12 generates and outputs the sinusoidal target current signal S6 to be traced by the peak current value P of the current detection signal S3 indicating the triangular inductor current $I_L$ flowing in the boost inductor 4.

The zero current detector 13 also generates and outputs the first detection pulses Sz1 and the second detection pulses Sz2 based on a voltage (in more detail, the zero current detection signal S7 outputted from the detection winding 21) that is proportional to the voltage $V_L$ across the boost inductor 4 that has been detected by the detection winding 21. Here, as described later, the zero current detector 13 outputs the first detection pulses Sz1 as a pulse signal whose falling edges are synchronized with the timing at which the inductor current $I_L$ becomes zero during a period where the AC input voltage Vac has positive polarity and outputs the second detection pulses Sz2 as a pulse signal whose falling edges are synchronized with the timing at which the inductor current $I_L$ becomes zero during a period where the AC input voltage Vac has negative polarity.

To cause the power converter including the switches 5a and 5b to operate in the current critical mode, convert the AC input voltage Vac to the DC output voltage Vdc, and output the DC output voltage Vdc, the driving signal generator 14 determines the polarity of the AC input voltage Vac based on the polarity signals S2a and S2b, generates the driving signals S9c and S9d to perform alternate on/off driving of the FETs 6 and 7 in synchronization with the cycles in the AC input voltage Vac, and, as described in detail later, generates and outputs the driving signals S9a and S9b based on the AC voltage signal S1, the detection pulses Sz1 and Sz2, the current detection signal S3, the voltage detection signal S4, and the target current signal S6 to the corresponding switches 5a and 5b to perform on/off driving.

Next, the respective operations of the zero current detector 13 and the driving signal generator 14 will be described in detail. First, the operations of the zero current detector 13 will be described in detail.

As described above, when the AC input voltage Vac has positive polarity, the voltage $V_L$ across the boost inductor 4 changes so that the potential of the input terminal 2a-side end becomes the AC input voltage |Vac| higher than the junction A-side end when the positive-polarity active switch (the switch 5b) is on and the potential of the junction A-side end becomes the voltage (Vdc−|Vac|) higher than the input terminal 2a-side end when the switch 5b is off. Meanwhile, when the AC input voltage Vac has negative polarity, the voltage $V_L$ across the boost inductor 4 changes so that the potential of the junction A-side end becomes the AC input voltage |Vac| higher than the input terminal 2a-side end when the negative-polarity active switch (the switch 5a) is on and the potential of the input terminal 2a side end becomes the voltage (Vdc−|Vac|) higher than the junction A-side end when the switch 5a is off.

This means that at the other end of the detection winding 21, which is formed with the polarity depicted in FIG. 1 relative to the boost inductor 4, the zero current detection signal S7, which is a rectangular signal like that depicted in FIG. 3, is generated such that in a state where the AC input voltage Vac has positive polarity (that is, a period where the switch 5a is off), the voltage is |Vac|/k (that is, a voltage in the positive (+) direction with the zero voltage (ground G potential or "reference potential") as a reference) when the switch 5b is on and the voltage is −(Vdc−|Vac|)/k (that is, a voltage in the negative (−) direction with the zero voltage (ground G potential or "reference potential") as a reference) when the switch 5b is off, and in a state where the AC input voltage Vac has negative polarity (that is, a period where the switch 5b is off), the voltage is −|Vac|/k when the switch 5a is on and the voltage is (Vdc−|Vac|)/k when the switch 5a is off.

Here, when the AC input voltage Vac has positive polarity, as described above, since the timing at which the inductor current $I_L$ flowing in the boost inductor 4 becomes zero is synchronized with the timing of falls (that is, falling edges) in the voltage $V_L$ across the boost inductor 4 (that is, a voltage that makes the potential of the input terminal 2a-side end low compared to the voltage of the junction A-side end as a reference) when the switch 5b is off, such timing is also synchronized with the timing at which the zero current detection signal S7 rises from the voltage −(Vdc−|Vac|)/k (that is, rising edges of the zero current detection signal S7). Similarly, when the AC input voltage Vac has negative polarity, as described above, since the timing at which the inductor current $I_L$ flowing in the boost inductor 4 becomes zero is synchronized with the timing of falls (that is, falling edges) in the voltage $V_L$ across the boost inductor 4 (that is, a voltage that makes the potential of the input terminal 2a-side end high compared to the voltage of the junction A-side end as a reference) when the switch 5a is off, such timing is also synchronized with the timing at which the zero current detection signal S7 falls from the voltage +(Vdc−|Vac|)/k (that is, falling edges of the zero current detection signal S7).

The clamp 23 clamps the zero current detection signal S7 to two clamping voltages (the zero voltage and the power supply voltage Vcc) to convert the zero current detection signal S7 to the rectangular signal S8, whose maximum voltage is the positive power supply voltage Vcc, whose minimum voltage is the zero voltage, and which is outputted. Since the rectangular signal S8 is a signal produced by merely converting the voltage level of the zero current detection signal S7, as depicted in FIG. 3, the rectangular signal S8 is a signal whose rising edges are synchronized with the rising edges of the zero current detection signal S7 and whose falling edges are synchronized with the falling edges of the zero current detection signal S7.

At the pulse outputter 24, the first comparator 24a compares the rectangular signal S8 and the comparison voltage Vr2 and, as depicted in FIG. 3, outputs the first detection pulses Sz1 (a pulse signal with the opposite phase to the rectangular signal S8) whose falling edges are synchronized with the rising edges of the rectangular signal S8 and whose rising edges are synchronized with the falling edges of the rectangular signal S8. The second comparator 24b compares the rectangular signal S8 and the comparison voltage Vr2 and, as depicted in FIG. 3, outputs the second detection pulses Sz2 (a pulse signal with the same phase as the rectangular signal S8) whose rising edges are synchronized with the rising edges of the rectangular signal S8 and whose falling edges are synchronized with the falling edges of the rectangular signal S8.

Here, as described above, when the AC input voltage Vac has positive polarity, since the timing at which the inductor current $I_L$ becomes zero is synchronized with rising edges of the zero current detection signal S7, such timing is therefore synchronized with falling edges of the first detection pulses Sz1 that have the opposite phase to the rectangular signal S8, which is to say, the opposite phase to the zero current detection signal S7. When the AC input voltage Vac has negative polarity, since the timing at which the inductor current $I_L$ becomes zero is synchronized with falling edges of the zero current detection signal S7, such timing is therefore synchronized with falling edges of the second detection pulses Sz2 that have the same phase as the rectangular signal S8, which is to say, the same phase as the zero current detection signal S7.

By doing so, based on the voltage $V_L$ across the boost inductor 4 detected by the detection winding 21, the zero current detector circuit 13 outputs the first detection pulses Sz1 whose falling edges are synchronized with the timing at which the inductor current $I_L$ becomes zero in a period where the AC input voltage Vac has positive polarity and outputs the second detection pulses Sz2 whose falling edges are synchronized with the timing at which the inductor current $I_L$ becomes zero in a period where the AC input voltage Vac has negative polarity.

Next, the operation of the driving signal generator 14 (mainly the operation that performs on/off driving of the switches 5a and 5b) will be described in detail.

When the AC input voltage Vac has positive polarity, in a state where the inductor current $I_L$ flows in the positive direction via the freewheeling switch (the switch 5a) while decreasing (a state where the discharging of energy from the boost inductor 4 continues, a state from time t14 onwards until the next time t11 is reached), the driving signal generator 14 sets the driving signal S9a for the switch 5a as a freewheeling switch at the high level for a calculated second on period T2 and then switches the driving signal S9a to the low level (or in other words, sets the freewheeling switch in the on state for only the second on period T2 and then in the off state) to switch the switch 5a off before the inductor current $I_L$ becomes zero. By doing so, the freewheeling switch performs synchronous rectification for the second on period T2 and outputs the inductor current $I_L$ toward the output terminal 3a, and after the second on period T2 has elapsed (that is, after the switch to the off state), the body diode of the switch 5a outputs the inductor current $I_L$ toward the output terminal 3a until the inductor current $I_L$ becomes zero (at time t11).

When the driving signal S9a has been switched to the low level (that is, when the freewheeling switch has been switched to the off state to end the second on period T2), the driving signal generator 14 starts the second measuring process that measures the elapsed time Td2 from the end of the second on period T2 until the start of the first on period T1.

After this, as depicted in FIG. 4, the driving signal generator 14 sets the driving signal S9b corresponding to the active switch (that is, the low-side switch 5b) at the high level in synchronization with a falling edge (time t12) of the first detection pulses Sz1 (in reality, at a time t13 that is delayed by the delay time Td1 (a fixed time) set in advance from the falling edge), to switch the active switch on.

When the active switch (the switch 5b) has been switched on, the driving signal generator 14 stores the elapsed time Td2 measured in the second measuring process, ends the execution of the second measuring process, and starts the first measuring process that measures the length (for ease of understanding, this length is also indicated using the symbol "T1") of the first on period T1 (that is, a period where the driving signal corresponding to the active switch (that is, the driving signal S9b) is set at the high level) where the active switch is switched to the on state. At arbitrary timing included in the period where the active switch has been switched on (that is, during the first on period T1), the driving signal generator 14 functions as a voltage meter, measures the AC input voltage |Vac| based on the AC voltage signal S1 outputted from the input voltage detector 9, measures the DC output voltage Vdc based on the voltage detection signal S4 outputted from the output voltage detector 12a, and stores the measured values.

Next, the operations of the various component elements from the timing (time t11) where the inductor current $I_L$ becomes zero until the active switch (the switch 5b) is switched on (time t13) will be described.

The body diode of the switch 5a becomes off when the inductor current $I_L$ becomes zero. At this time, the AC input voltage |Vac| is applied to the input terminal 2a-side end of the boost inductor 4 and, since the switch 5a has already been switched to the off state, a charging voltage (the DC output voltage Vdc) of the output capacitance of the switch 5b is applied to the junction A-side end of the boost inductor 4. For this reason, based on the voltage difference between the AC input voltage |Vac| and the charging voltage (the DC output voltage Vdc) of the output capacitance of the switch 5b, a resonance current due to the energy discharged from the output capacitance of the switch 5b flows in the boost inductor 4 in the opposite direction (that is, the negative (−) direction relative to the definition of the direction in which the inductor current $I_L$ flows in FIG. 1) as the inductor current $I_L$ (when the AC input voltage Vac has positive polarity) on a path from the drain terminal of the switch 5b via the junction A, the boost inductor 4, the input terminals 2a and 2b, a junction B, and the FET 7 in the on state to reach the source terminal of the switch 5b. The increase in the inductor current $I_L$ in the negative direction flips to a reduction at a point when the charging voltage (the drain-source voltage Vds of the switch 5b that is constructed of a FET, which is also the voltage at the junction A, see FIG. 1, and referred to hereinafter as the "voltage $Vds_{5b}$") of the output capacitance of the switch 5b has fallen to the AC input voltage |Vac|. Due to the inductor current $I_L$ in the negative direction continuing to flow even after this (that is, the discharging of the output capacitance of the switch 5b continuing), the voltage $Vds_{5b}$ rapidly falls to zero volts by time t13. Note that at the switch 5a, the output capacitance of the switch 5a that was substantially zero volts at time t11 is charged by the voltage difference between the voltage of the output terminal 3a (the DC output voltage Vdc) and the voltage of the junction A. That is, the output capacitance is ultimately charged by a voltage equal to the DC output voltage Vdc.

In this way, the converter 1 is configured so that when the AC input voltage Vac has positive polarity, the switch 5b as an active switch switches to the on state in a state where the drain-source voltage Vds (that is, the voltage $Vds_{5b}$) has fallen to zero volts, which means that a zero voltage switching operation is performed.

From time t13 onwards, due to the active switch (the switch 5b) having switched on (that is, due to the voltage $Vds_{5b}$ being zero volts, which is to say, the junction A being zero volts), the AC input voltage |Vac| is applied to the boost inductor 4. Due to this, while increasing, the inductor current $I_L$ flows in the positive (+) direction on a path from the input terminal 2a via the boost inductor 4, the switch 5b that is on, and the FET 7 that is on to reach the input terminal 2b. Since the inductor current $I_L$ is flowing through the boost inductor 4, energy also accumulates in the boost inductor 4.

After this, the driving signal generator 14 detects whether the current detection signal S3 indicating the inductor current $I_L$ that is increasing has reached the target current signal S6, and when the current detection signal S3 has reached the target current signal S6 (time t14), the driving signal generator 14 sets the driving signal S9b at the low level to switch off the active switch (the switch 5b), stores the measured length T1 of the first on period T1, and ends the first measuring process. The driving signal generator 14 sets the driving signal S9a at the high level in synchronization with the timing at which the driving signal S9b is set at the low level (that is, in synchronization with a state where dead time is provided (a sufficiently short time that is negligible compared to the lengths T1 and T2 of the periods T1 and T2 and the elapsed time Td2) to switch on the freewheeling switch (the switch 5a). Here, due to the energy accumulated in the boost inductor 4 being discharged via the switch 5a in the on state toward the output terminal 3a, while decreasing, the inductor current $I_L$ flows in the positive direction on a path from the input terminal 2a via the boost inductor 4, the switch 5a that is on, the output terminals 3a and 3b (and the smoothing capacitor 8), and the FET 7 that is on to reach the input terminal 2b.

When the freewheeling switch has been switched on, the driving signal generator 14 immediately starts measurement of the elapsed time from the freewheeling switch switching to the on state (which is also the elapsed time from the driving signal (the driving signal S9a) corresponding to the freewheeling switch switching to the high level). In a short period Tx immediately after the freewheeling switch has switched to the on state, the driving signal generator 14 also executes the correction time changing process that changes a correction time Tc so that the elapsed time Td2 (indicated as the "elapsed time $Td2_n$") that is measured in the second measuring process that starts when the second on period T2 has elapsed (that is, the time when the freewheeling switch is subsequently switched off) becomes the target time Ttg (a fixed time) set in advance. When, in the correction time changing process, the correction time Tc used in calculation of the length T2 of the second on period T2 in the immediately preceding execution of the second on period calculating process is indicated as the correction time $Tc_{n-1}$ and the elapsed time Td2 measured in the immediately preceding execution of the second measuring process is indicated as "elapsed time $Td2_{n-1}$", the driving signal generator 14 changes the correction time Tc used in the second on period calculating process executed following the correction time changing process by newly calculating the correction time Tc (indicated as the "correction time $Tc_n$") based on Equation (2) below.

$$Tc_n = Tc_{n-1} + Ttg - Td2_{n-1} \quad (2)$$

When the correction time changing process has been executed, the driving signal generator 14 executes the second on period calculating process in the same short period Tx to calculate the length of the second on period T2 for which the freewheeling switch is switched on (for ease of understanding, it is assumed that this length is expressed by the label "T2") based on Equation (1) given earlier. When it is assumed that the DC output voltage Vdc is constant, the switching cycles of the switches 5a and 5b of a converter of this type will change in accordance with the AC input voltage |Vac|. Since the switching periods are normally in a range of several to several tens of microseconds, these periods are sufficiently short compared to the cycles (around 15 to 20 ms) of the AC input voltage Vac. Since it is possible to regard the AC input voltage |Vac| as being constant for at least a period equivalent to several switching cycles of the switches 5a and 5b, it is possible to also regard the switching cycles of the switches 5a and 5b as being substantially constant.

This means that even if the elapsed time $Td2_{n-1}$ of the immediately preceding measurement was different to the target time Ttg, it is still possible to calculate the next correction time $Tc_n$ based on Equation (2) described above (that is, to calculate the next correction time $Tc_n$ by correcting the correction time $Tc_{n-1}$ used when calculating the immediately preceding second on period T2 by the difference between the two times) and to use this correction time $Tc_n$ when calculating the next second on period T2, thereby making it possible to match the next elapsed time $Td2_n$ to be calculated by the next second measuring process to the target time Ttg.

The following description uses a specific example. When as the result of calculating the immediately preceding second on period T2 with the correction time $Tc_{n-1}$ set at 0.2 μs, the elapsed time $Td2_{n-1}$ following the second on period T2 was measured at 0.7 μs that differs to the target time Ttg which is 1 μs, the driving signal generator 14 calculates, based on Equation (2) given earlier for correcting the correction time Tc, the next correction time $Tc_n$ as 0.5 μs(=0.2+1.0−0.7). By doing so, the length T2 of the second on period T2 calculated by Equation (1) for the second on period T2 given earlier above (that is, T2 that has been corrected using the correction time $Tc_n$) is shorter than the immediately preceding length T2 by 0.3 μs (the difference between the correction time $Tc_n$ and the correction time $Tc_{n-1}$). Due to this, the elapsed time $Td2_n$ to be calculated next is larger than the immediately preceding elapsed time $Td2_{n-1}$ (0.7 μs) by this difference (0.3 μs). That is, the elapsed time $Td2_n$ becomes 1.0 μs, which matches the target time Ttg.

Next, the driving signal generator 14 compares the elapsed time which is measured from the freewheeling switch (the switch 5a) switching to the on state and the second on period T2 calculated in the second on period calculating process and switches the driving signal S9a from the high level to the low level when the elapsed time reaches the second on period T2 (the time t15) to switch the freewheeling switch (the switch 5a) from the on state to the off state (that is, to end the second on period T2 where the freewheeling switch is on). At the same time as the end of the second on period T2, the driving signal generator 14 starts the second measuring process that measures the elapsed time from the end of the second on period T2 and measures the elapsed time Td2 (the elapsed time from the end of the second on period T2 to the start of the first on period T1) until a new falling edge of the first detection pulses Sz1 is reached (time t12) and the driving signal S9b corresponding to the low-side switch 5b (the active switch) is set at the high level (time t13).

When the AC input voltage Vac has positive polarity, the driving signal generator 14 repeats the operation from the time t11 to the next time t11 described above and, while matching the elapsed time Td2 depicted in FIG. 4 to the target time Ttg, outputs the driving signals S9a and S9b to the corresponding switches 5a and 5b as depicted in FIG. 3 so that the switches 5a and 5b are alternately switched on and off (that is, a switching operation). By doing so, in the converter 1, the power converter operates in current critical mode to convert the AC input voltage Vac to the DC output voltage Vdc which is outputted.

Also, in a state where the AC input voltage Vac has negative polarity and the inductor current $I_L$ flows while decreasing in the negative direction via the freewheeling switch (the switch 5b) (that is, a state where the discharging of energy from the boost inductor 4 continues, the state from time t24 depicted in FIG. 5 until before the next time t21 is reached), the driving signal generator 14 sets the driving signal S9b for the freewheeling switch (the switch 5b) at the high level for the calculated second on period T2, and then sets the driving signal S9b at the low level (that is, the freewheeling switch is switched to the on state for the second on period T2 and is then switched to the off state) to switch the switch 5b off before the inductor current $I_L$ becomes zero. By doing so, the freewheeling switch performs a synchronization rectification operation for the second on period T2, outputs the inductor current $I_L$ toward the output terminal 3a and, after the second on period T2 has elapsed (after switching to the off state), the body diode of the freewheeling switch outputs the inductor current $I_L$ toward the output terminal 3a until the inductor current $I_L$ becomes zero (time t21).

When the driving signal S9b has been set at the low level (that is, when the freewheeling switch has been set in the off state and the second on period T2 has ended), the driving signal generator 14 starts the second measuring process that measures the elapsed time Td2 from the end of the second on period T2 to the start of the first on period T1.

After this, as depicted in FIG. 5, the driving signal generator 14 switches the driving signal S9a corresponding to the active switch (that is, the high-side switch 5a) to a high level to set the active switch in an on state in synchronization with a falling edge (the time t22) of the second detection pulses Sz2 (in reality, at the time t23 which is delayed by the delay time Td1 (a fixed time) set in advance from the falling edge).

When the active switch (the switch 5a) has been switched on, the driving signal generator 14 stores the elapsed time Td2 measured in the second measuring process, stops the execution of the second measuring process, and starts the first measuring process that measures the length T1 of the first on period T1 in which the active switch is set in the on state (that is, the period where the driving signal (the driving signal S9a) corresponding to the active switch is set at the high level). At arbitrary timing included in the period where the active switch is set in the on state (that is, the first on period T1), the driving signal generator 14 functions as a voltage meter, measures the AC input voltage |Vac| based on the AC voltage signal S1 outputted from the input voltage detector 9, measures the DC output voltage Vdc based on the voltage detection signal S4 outputted from the output voltage detector 12a, and stores these values.

Next, the operation of the respective component elements from the timing at which the inductor current $I_L$ becomes zero (the time t21) until the active switch (the switch 5a) is switched to the on state (the time t23) will be described.

When the inductor current $I_L$ becomes zero, the body diode of the switch 5b is off. At this time, the voltage (Vdc−|Vac|) is applied to the input terminal 2a-side end of the boost inductor 4 and since the switch 5b has already been switched to the off state, the potential of the junction A-side end of the boost inductor 4 does not become zero volts (the ground potential) and a voltage that is lower than the potential of the output terminal 3a by the charging voltage of the output capacitance of the switch 5a (that is, the DC output voltage Vdc lower) is applied to the junction A-side end. For this reason, based on the voltage difference between the AC input voltage |Vac| and the charging voltage (the DC output voltage Vdc) of the output capacitance of the switch 5a, a resonance current due to the energy discharged from the output capacitance of the switch 5a flows in the boost inductor 4 in the opposite direction (that is, the positive (+) direction relative to the definition of the direction in which the inductor current $I_L$ flows in FIG. 1) as the inductor current $I_L$ (when the AC input voltage Vac has negative polarity) on a path from the drain terminal of the switch 5a via the FET 6 that is on, the junction B, the input terminals 2b and 2a, the boost inductor 4, and the junction A to reach the source terminal of the switch 5a. The increase in the inductor current $I_L$ in the positive direction flips to a decrease when the charging voltage of the output capacitance of the switch 5a has fallen to the AC input voltage |Vac| (that is, when the voltage $Vds_{5b}$ has risen to (Vdc−|Vac|)). Due to the inductor current $I_L$ in the positive direction continuing to flow even after this (that is, the discharging of the output capacitance of the switch 5a continuing), the voltage $Vds_{5b}$ rapidly rises to the DC output voltage Vdc by time t23. Note that at the switch 5b, the output capacitance of the switch 5b that was substantially zero volts at the time t21 is also charged by the DC output voltage Vdc.

In this way, the converter 1 is configured so that even when the AC input voltage Vac has negative polarity, the switch 5a switches to the on state when the potential of the source terminal of the switch 5a as an active switch has risen to the DC output voltage Vdc (that is, when the drain-source voltage of the switch 5a that is composed of a FET has fallen to zero volts), which means that a zero voltage switching operation is performed.

From the time t23 onwards, due to the active switch (the switch 5a) having switched on (that is, when the voltage $Vds_{5b}$ has become the DC output voltage Vdc, that is, the junction A has become the DC output voltage Vdc), the AC input voltage |Vac| is applied to the boost inductor 4. Due to this, while increasing, the inductor current $I_L$ flows in the negative (−) direction on a path from the input terminal 2b via the junction B, the FET 6 that is on, the switch 5a that is on, and the boost inductor 4 to reach the input terminal 2a. Since the inductor current $I_L$ flows to the boost inductor 4, energy accumulates in the boost inductor 4.

After this, the driving signal generator 14 detects whether the current detection signal S3 indicating the inductor current $I_L$ that is increasing has reached the target current signal S6, and when the current detection signal S3 has reached the target current signal S6 (time t24), the driving signal generator 14 sets the driving signal S9a at the low level to switch off the active switch (the switch 5a), stores the measured length T1 of the first on period T1, and ends the first measuring process. The driving signal generator 14 also sets the driving signal S9b at the high level in synchronization with the timing at which the driving signal S9a is set at the low level (that is, in synchronization with a state where dead time is provided) to switch on the freewheeling switch (the switch 5b). By doing so, the energy that had accumulated in the boost inductor 4 is discharged via the switch 5b in the on state toward the output terminal 3a and the inductor current $I_L$ that decreases flows in the negative direction on a path from the input terminal 2b via the FET 6 in the on state, the output terminals 3a and 3b (and the smoothing capacitor 8), the switch 5b in the on state, and the boost inductor 4 to the input terminal 2a.

When the freewheeling switch has been switched to the on state, the driving signal generator 14 immediately starts to measure the elapsed time from the freewheeling switch switching to the on state (which is also the elapsed time from the driving signal (the driving signal S9b) corresponding to the freewheeling switch switching to the high level). In a short period Tx immediately after the freewheeling switch has switched to the on state, the driving signal generator 14 also executes the correction time changing process that changes the correction time Tc so that the elapsed time Td2 (the elapsed time $Td2_n$) that is measured in the second measuring process that starts when the second on period T2 has elapsed (that is, the time when the freewheeling switch is subsequently switched off) becomes the target time Ttg. When, in the correction time changing process, the correction time Tc used in calculation of the length T2 of the second on period T2 in the immediately preceding execution of the second on period calculating process is indicated as the correction time $Tc_{n-1}$ and the elapsed time Td2 measured in the immediately preceding execution of the second measuring process is indicated as "elapsed time $Td2_{n-1}$", the driving signal generator 14 newly calculates the correction time Tc (indicated as the "correction time $Tc_n$") based on Equation (2) given earlier to correct the correction time Tc to be used in the second on period calculating process executed following the correction time changing process.

When the correction time changing process has been executed, the driving signal generator 14 executes the second on period calculating process in the same short period Tx to calculate, based on Equation (1), the length T2 of the second on period T2 in which the freewheeling switch is set in the on state.

For this reason, even if the elapsed time $Td2_{n-1}$ in the immediately preceding measurement was different to the target time Ttg, by calculating the next correction time $Tc_n$ based on Equation (2) described above (that is, by calculating the next correction time $Tc_n$ by correcting the correction time $Tc_{n-1}$ used in the calculation of the immediately preceding second on period T2 by the difference between the two times) and using this next correction time $Tc_n$ in the calculation of the next second on period T2, in the same way as when the AC input voltage Vac described above has positive polarity, it is possible to match the next elapsed time Td2$_n$ measured in the next second measuring process to the target time Ttg.

After this, the driving signal generator 14 compares the measured elapsed time from the freewheeling switch (the switch 5b) switching to the on state and the second on period T2 calculated in the second on period calculating process, and switches the driving signal S9b from the high level to the low level when the elapsed time has reached the second on period T2 (time t25) to switch the freewheeling switch (the switch 5b) from the on state to the off state (that is, to end the second on period T2 where the freewheeling switch is switched on). At the same time as the end of the second on period T2, the driving signal generator 14 starts the second measuring process that measures the elapsed time from the end of the second on period T2 and measures the elapsed time Td2 (the elapsed time from the end of the second on period T2 until the start of the first on period T1) until a new falling edge (time t22) of the second detection pulses Sz2 is reached and the driving signal S9a corresponding to the high-side switch 5a (the active switch) is switched to the high level (time t23).

When the AC input voltage |Vac| has negative polarity, the driving signal generator 14 repeats the operation from time t21 described above to the next time t21 and, while matching the elapsed time Td2 depicted in FIG. 5 to the target time Ttg, outputs the driving signals S9a and S9b to the corresponding switches 5a and 5b as depicted in FIG. 3 so that the switches 5a and 5b are alternately switched on and off (that is, a switching operation). By doing so, in the AC converter 1, when the AC input voltage Vac has negative polarity also, the power converter operates in current critical mode to convert the AC input voltage Vac to the DC output voltage Vdc which is outputted.

In this way, with the converter 1, when the AC input voltage Vac has positive polarity and has negative polarity, as described above, the driving signal generator 14 corrects (controls) the correction time Tc, and in turn the length T2 of the second on period T2 so that the elapsed time Td2 from the end of the second on period T2 to the start of the first on period T1 is matched to the target time Ttg based on the measured first on period T1 and the elapsed time Td2, the target time Ttg set in advance, the AC input voltage Vac, and the DC output voltage Vdc. This means that with the converter 1, when the AC input voltage Vac has positive polarity, by setting the target time Ttg in advance longer than the time from the timing (time t11) at which the inductor current I$_L$ that was decreasing and flowing in the positive direction becomes zero until the timing (time t13) at which the active switch (the low-side switch 5b when the AC input voltage Vac has positive polarity) is switched on, it is possible to reliably switch off the freewheeling switch (the high-side switch 5a when the AC input voltage Vac has positive polarity) before the timing at which the inductor current I$_L$ becomes zero. Similarly, when the AC input voltage Vac has negative polarity, by setting the target time Ttg in advance longer than the time from the timing (time t21) at which the inductor current I$_L$ that was decreasing and flowing in the negative direction becomes zero until the timing (time t23) at which the active switch (the high-side switch 5a when the AC input voltage Vac has negative polarity) is switched on, it is possible to reliably switch off the freewheeling switch (the low-side switch 5b when the AC input voltage Vac has negative polarity) before the timing at which the inductor current I$_L$ becomes zero.

Accordingly, with the converter 1, it is possible, while avoiding measurement of the voltage at the junction A (the drain-source voltage Vds$_{5b}$ of the low-side switch 5b), to reliably avoid, when the AC input voltage Vac has positive polarity, an increase in the inductor current I$_L$ in the opposite direction (the negative direction) that would occur if the freewheeling switch (that is, the high-side switch 5a) were kept on even after the timing at which the inductor current I$_L$ that was flowing in the positive direction while decreasing reaches zero (that is even in the period where the inductor current I$_L$ flows in the negative direction). In other words, it is possible to avoid an increase in a current that flows on a path from the output terminal 3a via the freewheeling switch that is on, the boost inductor 4, the input terminals 2a and 2b, and the FET 7 that is on to reach the output terminal 3b. It is also possible to reliably avoid, when the AC input voltage Vac has negative polarity, an increase in the inductor current I$_L$ in the opposite direction (the positive direction) that would occur if the freewheeling switch (that is, the low-side switch 5b) were kept on even after the timing at which the inductor current I$_L$ that was flowing in the negative direction while decreasing reaches zero (that is even in the period where the inductor current I$_L$ flows in the positive direction). In other words, it is possible to avoid an increase in a current that flows on a path from the output terminal 3a via the FET 6 that is on, the input terminals 2b and 2a, the boost inductor 4, and the freewheeling switch to reach the output terminal 3b.

Note that although the converter 1 described above uses a configuration where a switch that functions as an active switch as described above performs zero voltage switching due to the DC output voltage Vdc being DC 400V, the AC input voltage Vac being AC 100V (whose amplitude |Vac|=141V), for example, so that the relationship Vdc>2×|Vac| is satisfied, for a converter of a configuration where the DC output voltage Vdc and the AC input voltage Vac (whose amplitude is |Vac|) do not satisfy the Vdc>2×|Vac| (that is, a configuration where Vdc≤2×|Vac| is satisfied), it is still possible to avoid an increase in the inductor current I$_L$ in the opposite direction by using the same configuration as the converter 1.

Also, although the converter 1 described above uses a configuration where the correction time Tc and in turn the length T2 of the second on period T2 are corrected so that the elapsed time Td2 from the end of the second on period T2 of the freewheeling switch to the start of the first on period T1 of the active switch matches the target time Ttg for a configuration that includes a totem pole-type power converter equipped with the boost inductor 4, the switches 5a and 5b, and the FETs 6 and 7, and where, corresponding to the polarity of the AC input voltage Vac, one of the switches 5a and 5b functions as an active switch and the other functions as a freewheeling switch, it is also possible to apply the present invention to a converter that includes a non-totem pole-type power converter.

As one example, it is also possible to apply the present invention to a configuration equipped with a power converter that includes, like the boost-type PFC disclosed in FIG. 2 of Japanese Laid-open Patent Publication No. 2014-11907, a series circuit with a switch and a boost inductor to which a DC voltage (a pulsating voltage) outputted from a rectifier diode bridge circuit 11 that rectifies an AC voltage is applied as the input voltage (that is, a series circuit with an inductor L1 and a transistor Q1 as an active switch), and a synchronous rectifier (that is, a transistor Q2 as a freewheeling switch) connected to a junction between the boost inductor and the switch, and that operates in current critical mode to boost the input voltage, convert the input voltage to an output voltage, and output the output voltage.

It is also possible to apply the present invention to a configuration equipped with a power converter which, like a dual-boost type bridgeless PFC, includes two sets of a series circuit, which is composed of a boost inductor, to which an input voltage is applied, and a switch, and a synchronous rectifier connected to a junction between the boost inductor and the switch, and operates in current critical mode to boost the input voltage, convert the input voltage to an output voltage, and output the output voltage (for example, for the configuration disclosed in FIG. 1 of Japanese Patent No. 5,387,183, a configuration where a synchronous rectification switch is added in parallel to diodes D1 and D2).

What is claimed is:

1. A switching power supply comprising:
   a power converter that includes a series circuit with a boost inductor, to which an input voltage Vi is applied, and a switch, and a synchronous rectifier connected to a junction between the boost inductor and the switch, and converts the input voltage Vi to an output voltage Vo which is outputted;
   a zero current detector that includes a detection winding, which is magnetically coupled to the boost inductor and outputs a zero current detection signal whose voltage value changes in proportion to a voltage across the boost inductor, and detects zero timing at which an inductor current flowing in the boost inductor becomes zero;
   a controller that executes an on/off control process that sets the switch in an on state based on the zero timing, causes energy to accumulate in the boost inductor, switches the switch from the on state into an off state, then sets the synchronous rectifier in a synchronous rectification state to have the energy discharged from the boost inductor to cause the power converter to output the output voltage Vo; and
   a voltage meter that measures the input voltage Vi and the output voltage Vo,
   wherein the controller causes a second on period T2, where the synchronous rectifier is set in the synchronous rectification state, to end before the zero timing by executing:
   a first measuring process that measures a first on period T1 where the switch is set in an on state;
   a second on period calculating process that calculates, when a correction time for the second on period T2 is expressed as Tc, the second on period T2 according to a following expression
   $$T2 = T1 \times |Vi|/(Vo - |Vi|) - Tc;$$
   the on/off control process that sets the synchronous rectifier in the synchronous rectification state for only the second on period T2 calculated by the second on period calculating process;
   a second measuring process that measures an elapsed time from an end of the second on period T2 to a start of the first on period T1; and
   a correction time changing process that changes the correction time Tc so that the elapsed time measured by the second measuring process becomes a target time set in advance.

2. The switching power supply according to claim 1, wherein during the correction time changing process, the controller calculates, when the correction time Tc used when calculating a length T2 of the second on period T2 in an immediately preceding execution of the second on period calculating process is expressed as $Tc_{n-1}$, the target time is expressed as target time Ttg, and the elapsed time Td2 measured in an immediately preceding execution of the second measuring process is expressed as $Td2_{n-1}$, the correction time Tc as a new correction time $Tc_n$ based on a following equation to change the correction time Tc used in the second on period calculating process executed following the correction time changing process.
$$Tc_n = Tc_{n-1} + Ttg - Td2_{n-1}$$

* * * * *